UNITED STATES PATENT OFFICE.

HERBERT SPENCER STARK, OF JOHANNESBURG, TRANSVAAL.

PROCESS OF EXTRACTING GOLD FROM ORES, &c.

SPECIFICATION forming part of Letters Patent No. 769,280, dated September 6, 1904.

Application filed November 30, 1903. Serial No. 183,243. (No specimens.)

*To all whom it may concern:*

Be it known that I, HERBERT SPENCER STARK, mining engineer, a citizen of the United States of America, residing at Johannesburg, in the Colony of Transvaal, (address, post-office box 1081,) have invented a new Process for the Extraction of Gold from Pyritic Auriferous Ores, particularly applicable to the recovery of gold from the residues resulting from the treatment of such ores by ordinary cyanid solutions, of which the following is a specification.

This invention relates to a new method or process of extracting gold from pyritic auriferous ores whose inherent acidity requires to be neutralized before they can be successfully treated with simple cyanid solutions and has hitherto been in certain extreme cases—*e. g.*, with tailings and residues that have become excessively acid by prolonged exposure to the atmosphere—a source of so much embarrassment and difficulty as to have completely baffled all attempts to deal with them satisfactorily by ordinary cyanid solutions as aforesaid.

My method consists, briefly, in treating the previously-crushed ore with a solution of sulfocyanid of an alkali metal in the presence of an oxidizing agent. This latter, assisted by the inherent acidity of the ore, brings about a slow decomposition of a portion of the sulfocyanid, resulting in the production in close proximity to the gold particles of nascent cyanogen and hydrocyanic acid. Both of these substances are, as is well known, powerful gold solvents, and thus upon their formation dissolve out any adjacent metallic gold, which is thereupon carried into the sulfocyanid solution. This solution is subsequently leached out of the ore and its contained gold separated from it by any suitable means. In order to further elucidate the chemical reactions that occur, I give below certain equations which appear to me as the result of a series of investigations to represent what takes place, premising that the $H_2SO_4$ is the acid native to the ore. The reaction takes place in two stages, viz:

(1.) 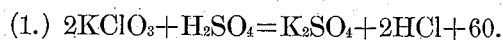

$$2KClO_3 + H_2SO_4 = K_2SO_4 + 2HCl + 6O.$$

(2.) 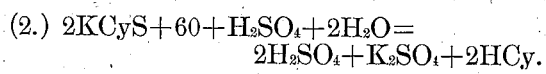

$$2KCyS + 6O + H_2SO_4 + 2H_2O = 2H_2SO_4 + K_2SO_4 + 2HCy.$$

Thus the ultimate result may be represented

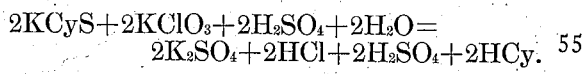

$$2KCyS + 2KClO_3 + 2H_2SO_4 + 2H_2O = 2K_2SO_4 + 2HCl + 2H_2SO_4 + 2HCy.$$

It will be seen that the amount of $H_2SO_4$ present is the same both before and after the reaction. Cyanogen appears in its nascent state during its transition from $KCyS$ to $HCy$.

The sulfocyanids which I prefer to use, on account of their comparatively low cost, are those of potassium or sodium. The oxidizing agent used therewith may be either atmospheric oxygen or a compound which will readily part with its contained oxygen, such as potassium chlorate, potassium permanganate, sodium nitrate, or sodium peroxid, according to the nature of the ores under treatment.

Although my process is applicable, as already stated, to all pyritic auriferous ores, whatever their condition, I propose now to consider its application to one or two of the extreme cases previously referred to, in which the acidity of the ore is such as to have frustrated the efforts that have been made to treat it successfully with simple cyanid solutions. I allude to the residues of ores which have already been primarily treated by such solutions and to certain non-cyanided tailings that have been merely exposed for more or less prolonged periods to the action of the atmosphere. In both such cases there is usually known to be a percentage of gold remaining in the ore varying in amount with the nature thereof and the treatment to which it has previously been subjected, the attempts to recover which in a sufficiently economical and practical manner have hitherto ended in failure except in those few instances where the ore is still rich enough to warrant the additional expenditure required to first neutralize its acidity. Dealing then, for example, by my process with the usually-discarded residues of ores that have already been more or less efficiently treated by simple cyanid solutions I proceed as follows: I first oxidize the residues, preferably by prolonged exposure to the atmosphere. As the thoroughness of the oxidation and the consequent measure of success of the process depend largely on the duration of such weathering, I consider that under such conditions as ordinarily prevail on the Witwatersrand gold-fields the period should not be less than six months and may with advantage be extended two or more years. When the decomposition is sufficiently advanced, I pump onto the top of the dump large quantities of water, allow it to percolate through the mass, and run the liquor as it issues from the bottom of the heap through extractor-boxes containing scrap-iron, upon which the gold is precipitated from its solution and thereafter fined by known methods. I have found disused battery-screens to be very cheap and serviceable as a precipitating medium. The liquor which issues from the extractor-boxes is run into a sump, and thence pumped back for further percolation through the residues, as its effectiveness as a gold solvent is enhanced by such repeated use, since each renewal of the operation increases the percentage of gold-dissolving chemicals contained therein. In this case use is made both of the sulfocyanid occurring naturally as a product of decomposition of the pyritic residues and of the atmospheric oxygen occluded among or drawn into the mass, and good results may be obtained by carrying out the process as described. I prefer, however, to accelerate and perfect the extraction by artificially enriching the sulfocyanid solution and by increasing the amounts of nascent cyanogen and hydrocyanic acid liberated from said solution by adding to it, as an oxidizer, preferably potassium chlorate. Speaking generally, the stronger the sulfocyanid solution the more readily and efficiently will the extraction proceed; but its precise strength in any given case must obviously be limited by commercial considerations. As an example, I may say that I have obtained satisfactory results when maintaining the solution at .0045 per cent. strength. As an indication of the amount of potassium chlorate to be employed, it may be added that good results have been obtained by using about equal parts, by weight, to those of the sulfocyanid.

The peculiar suitability of my method to the purpose under consideration will be evident when it is borne in mind that in a mass of pyritic residues weathered or exposed to the air for prolonged periods any pyritic crystals which have passed unbroken through the ore-crushing machinery become decomposed and pulverized, thus exposing and rendering accessible to solvents such gold as was formerly inclosed in them. Owing, however, to the pronounced acidity of the decomposed pyrites, ordinary cyanid when in contact therewith is destroyed as such and cannot, therefore, be employed for recovery of the gold. Moreover, among the products of oxidation of the residues there is formed, as already stated, a sulfocyanid having as a base the metal of the original cyanid dispersed throughout the mass in close contact with the gold particles, and therefore in a most advantageous position for effecting their solution when treated in the manner described. Another product of oxidation of such residues is the thiosulfate of one or more of the alkali metals, which itself when in solution dissolves out the gold, though to a lesser extent than the principal agents previously referred to.

When dealing by my method with freshly-crushed or non-cyanided pyritic ores, they may after passing over the amalgamating-plates or not, as may appear most desirable, be treated with the sulfocyanid solution, which, together with a suitable oxidizer, is passed through them in ordinary leaching-vats or in any other manner. Obviously no preliminary weathering or oxidation is necessary in this instance, that operation being requisite only in the case of residues in order to render them more susceptible to my mode of treatment.

In the selection of an oxidizing agent the nature of the process in which it is to assist should be considered, having regard to the fact that the rate of decomposition of the sulfocyanid varies with the oxidizer, to whose action it is exposed. Thus, when treating large residue dumps oxidation should proceed slowly in order that liberation of nascent cyanogen may occur even when the solution is approaching the base of the dump. For this purpose either atmospheric oxygen alone, or in addition thereto preferably potassium chlorate, are suitable. Again, when leaching ores in a vat an oxidizing agent having a quicker action—such, for example, as sodium peroxid—is recommended.

In all ordinary cases the acid which is inherent in pyritic auiferous ores has been found to be sufficient for my purpose; but it may obviously be artificially augmented when necessary.

I claim as my invention—

1. The process of extracting metallic gold from acid pyritic auriferous ores, consisting in treating the crushed ore with a solution of sulfocyanid of an alkali metal, in the presence of an oxidizing agent, including atmospheric oxygen, whereby the gold is dissolved out by the nascent cyanogen and hydrocyanic acid, produced in the presence of the acid in such ore by the mutual reaction of the sulfocyanid and the oxidizing agent; and afterward separating the gold from the solution thus formed, substantially as hereinbefore described.

2. The process of recovering gold from the residues resulting from the treatment of pyritic auriferous ores by the ordinary cyanid solutions; consisting in first oxidizing such residues for the purpose of liberating the gold inclosed in the pyrites, and producing in the mass sulfocyanid and thiosulfate of one or more of the alkali metals; then passing through them a quantity of water, which forms, with said salts, a solution in which the gold is dissolved out both by the nascent cyanogen and the hydrocyanic acid evolved by mutual reaction of the sulfocyanid and atmospheric oxygen in the presence of the acid in the ore, and by the thiosulfate; and subsequently separating the gold from the solution thus formed, substantially as hereinbefore described.

3. The process of extracting gold from pyritic residues of the cyanid treatment which consists in oxidizing such residues, leaching them with water, precipitating the gold contained in the solution, releaching the residues with the liquor obtained from the precipitation of the gold, and again precipitating the gold.

4. The process of extracting gold from pyritic residues of the cyanid treatment which consists in oxidizing such residues, leaching them with water containing a sulfocyanid, precipitating the dissolved gold, releaching the residues with the liquor after the precipitation of the contained gold, and again precipitating.

5. The process of extracting gold from pyritic ores, which consists in leaching the ore with a solution of a sulfocyanid of an alkali metal and an oxidizing compound and precipitating the dissolved gold.

6. The process of extracting gold from pyritic residues of the cyanid treatment which consists in oxidizing such residues, leaching them with water containing an oxidizing compound and precipitating the dissolved gold.

7. The process of extracting gold from oxidized pyritic residues of the cyanid treatment which consists in leaching them with water in the presence of an oxidizing agent, substantially as described.

In witness whereof I have hereunto set my hand in presence of two witnesses.

HERBERT SPENCER STARK.

Witnesses:
GEORGE MCDOUGALL,
HAROLD ERNEST KISCH.